United States Patent [19]
Bunce et al.

[11] Patent Number: 5,225,990
[45] Date of Patent: Jul. 6, 1993

[54] APPARATUS AND METHODS FOR BAGGAGE RECONCILIATION AND LOCATION

[75] Inventors: Timothy P. Bunce, Kingston upon Thames; Christopher J. S. Everett, Epsoms Downs; Saif K. Pathan, Harrow; David A. Williams, Berkhampstead, all of England

[73] Assignee: Brals Limited, Tring, United Kingdom

[21] Appl. No.: 674,916

[22] Filed: Mar. 26, 1991

[51] Int. Cl.$^5$ .................. G06F 15/20; G06F 15/00
[52] U.S. Cl. .................................... 364/478; 364/407
[58] Field of Search ............... 364/478, 401, 407; 235/384; 209/559; 198/350, 412, 410

[56] References Cited

U.S. PATENT DOCUMENTS

| | | | |
|---|---|---|---|
| 3,666,073 | 5/1972 | Lings et al. | 198/412 |
| 3,695,462 | 10/1972 | Sullivan | 198/350 |
| 3,704,773 | 12/1972 | Lingg et al. | 198/410 |
| 4,058,217 | 11/1977 | Vaughan et al. | 209/559 |
| 4,711,994 | 12/1987 | Greenberg . | |
| 4,984,156 | 1/1991 | Mekata | 364/407 |

FOREIGN PATENT DOCUMENTS

| | | |
|---|---|---|
| 0408809A1 | 1/1991 | European Pat. Off. . |
| 8302826 | 8/1983 | Netherlands . |
| 2224147 | 10/1990 | United Kingdom . |

OTHER PUBLICATIONS

"Passenger/Baggage Reconciliation and Location System BRaLS a Fully Integrated, System for Use Network Wide a Complete and Failsafe Package", pp. 1-7.
"Airport Support", Mar. 1989, 1 page.
"Airports International", Nov. 1988, 1 page.

*Primary Examiner*—Jerry Smith
*Assistant Examiner*—Jim Trammell
*Attorney, Agent, or Firm*—Cushman, Darby & Cushman

[57] ABSTRACT

A baggage checking system is described, primarily for use at airports and distinct from airline seat reservation systems. The baggage checking system takes flight numbers, travellers' identification data and baggage tag numbers from check-in and transfer desks and collates it with baggage tag numbers read at baggage loading points. If an attempt is made to load a bag on an incorrect flight an alarm is given at the loading point and the system is inhibited at that loading point until supervisory action is taken. In addition an alarm is given if an attempt is made to load a bag with the same tag number as another bag. Rules concerning when an alarm should be given in relation to tag numbers checked-in, and tag numbers of passengers boarded can be changed at will, even during loading.

26 Claims, 3 Drawing Sheets

APPARATUS AND METHODS FOR BAGGAGE RECONCILIATION AND LOCATION

BACKGROUND OF THE INVENTION

The present invention relates to apparatus and methods for establishing, checking and displaying information relating to travellers, the baggage in their charge, and the location of travellers and their baggage in relation to a vehicle in which they are to travel.

In loading baggage on to vehicles, especially aircraft, two of the problems which occur are ensuring that bags are loaded on to aircraft which are travelling to the correct destination and ensuring that only bags with accompanying passengers travel in a particular aircraft (except where bags are specially authorised to travel unaccompanied). Solving the first of these problems reduces the quite considerable amount of baggage which at present travels to the wrong destination and solving the second of these problems provides a higher degree of airline safety.

Some of the information for checking and reconciling baggage is already collected in airline systems at check-in but usually the main frame computer operated by, or on behalf of, an airline is in an entirely different location, often in another continent, from the check-in so causing problems with time delays in transferring data and receiving computed outputs, especially when breakdowns occur.

Any baggage reconciliation system has to deal not only with direct point to point transfer where passengers and their baggage travel direct from one location to another but also inter-line transfer where a passenger initially checks in for one flight but changes to another at an intermediate stop before arriving at the final destination. In addition there are several special categories of bags, known as "expedite bags" which are conveyed without any corresponding passenger and these bags are also known as "rush bags" which have to be loaded without an accompanying passenger because the bag arrives too late, or has been previously lost or delayed. In addition "crew bags" belonging to crew members are not always checked in.

Thus there exists a need for apparatus and methods which overcome or at least ameliorate some or all of the problems mentioned above.

SUMMARY OF THE INVENTION

Novel apparatus and methods for baggage reconciliation are disclosed in which data identifying baggage is entered into a baggage reconciliation system at the time bags are loaded into a vehicle or into a container which is itself later placed in a vehicle. The data entered is automatically used to check that the baggage is loaded on the correct vehicle and/or the passenger accompanying each bag is about to (or has already) entered the vehicle. The data entered may in addition, or as an alternative, be used to provide a visual report specifying baggage loaded into a vehicle or containers for the vehicle and passengers about to enter or already aboard the vehicle. In addition or as an alternative the system may provide an audible or visual warning if a bag is about to be loaded into a vehicle (or container for the vehicle) which has the same identification data, such as tag number, as another bag for that vehicle, and/or does not have an appropriate destination, and/or has no expected or actual passenger specified as travelling with the bag (unless the bag is specially authorised for travel without an accompanying traveller).

According to a first aspect of the invention there is provided apparatus f©r checking travellers' baggage comprising check-in means for entering and storing for each traveller identification data for the traveller, for at least one item of baggage in the traveller's charge and to travel to the same destination as the traveller (but not under the traveller's control) and for a vehicle on which the traveller and the said item are to travel, loading-check means for entering for each item of baggage identification data of the item and of a vehicle on which it is intended to load that item, the loading-check means being positioned, in operation, at a location where baggage is loaded for travel in vehicles.

collation means, coupled for communication with the check-in means and the loading-check means, for automatically collating data received from the check-in means and the loading-check means, and loading-control means, coupled to the collation means, for giving an indication, visible or audible, at the said location of the loading-check means when the automatic collation determines, from the identification data of an item of baggage intended to be loaded, that the item should not be loaded at least until authorisation is obtained.

According to a second aspect of the invention there is provided a method for checking travellers' baggage, comprising a check-in procedure for entering and storing for each traveller identification data for the traveller, for at least one item of baggage in the traveller's charge and to travel to the same destination as the traveller (but not under the traveller's control), and for a vehicle on which the traveller and the said item are to travel, a loading-check procedure at a location where baggage is loaded for travel in vehicles and in which identification data of baggage is entered, automatically collating data from the check-in procedure and the loading-check procedure, and giving an indication at the said location when the automatic collation determines, from the identification data of an item of baggage intended to be loaded, that the item should not be loaded at least until authorisation is obtained.

The first and second aspects of the invention are particularly directed to the above-mentioned problem of airline passengers' baggage travelling to the wrong destination by helping to prevent baggage being loaded on to an incorrect aircraft.

The loading-check can be carried out when baggage is placed in a container which is to go in a vehicle. When the baggage reconciliation system of the invention is installed for use in loading aircraft, the result of collation can cause an alarm to be given when a bag is about to be loaded on a plane for the wrong destination or without a passenger travelling with that bag (special arrangements being made for expedite bags, rush bags and crew bags). As an alternative or in addition, operation of an apparatus or method according to the invention may be automatically halted until appropriate action is taken by an authorised person. Where baggage loading is efficiently supervised, halting the checking system also halts loading.

Apparatus according to the first aspect of the invention preferably includes boarding-check means (for example comprising boarding gate terminals) for entering the identification data of each traveller who passes into a location where travellers have already entered a vehicle, or must, unless released, enter a vehicle; for example having passed an airport boarding gate, passengers are located in a lounge or on an aircraft and must travel unless they are specially released. The baggage checking apparatus may then be interrogated to cause a print-out to be given, at any time, particularly when all passengers are on board and all baggage is loaded, to show whether every bag is accompanied on an aircraft by the passenger in charge of the bag. Thus effective aid is given with the above-mentioned safety problem.

In some circumstances persons may travel as a group and some persons in the group may have items in bags belonging to other members of the group or the group as a whole. Some members of the group may not even have their own bags and a safety risk occurs when such a person does not board an aircraft. The collation means may be arranged to take such a circumstance into account by providing a display and/or print-out identifying all bags belonging to a group in which not all members of the group have boarded the aircraft.

Methods according to the second aspect of the invention may include a boarding-check procedure and extended collation to provide print-outs giving a similar indication of bags and travellers on a vehicle.

Bags are usually identified by numbers on tags attached to the bags but since the numbers are not always allocated by the checking system of the invention, it is possible that duplicate numbers may occur. Apparatus and methods of the invention may include means and steps to deal with this problem.

According to a third aspect of the invention there is provided apparatus for checking travellers baggage comprising check-in means for entering and storing for each traveller identification data for the traveller, for at least one item of baggage in the traveller's charge and to travel to the same destination as the traveller (but not under the traveller's control) and for a vehicle on which the traveller and the said item are to travel.

loading-check means for entering for each item of baggage identification data of the item and of a vehicle on which it is intended to load that item, the loading-check means being positioned, in operation, at a location where baggage is loaded for travel in vehicles, collation means, coupled for communication with the check-in means and the loading-check means, for automatically collating data received from the check-in means and the loading-check means, loading-control means for giving an indication, visible or audible, at the said location of the loading-check means related to identification data for an item of baggage entered at the loading-check means, each time such data is entered, and strategy-control means, available in normal operation of the apparatus to an authorised person, for changing the relationship between the indication given and the identification data for an item of baggage entered at that time.

According to a fourth aspect of the invention there is provided a method for checking travellers' baggage comprising a check-in procedure for entering and storing for each traveller identification data for the traveller, for at least one item of baggage in the traveller's charge and to travel to the same destination as the traveller (but not under the traveller's control), and for a vehicle on which the traveller and the said item are to travel, a loading-check procedure at a location where baggage is loaded for travel in vehicles and in which identification data of baggage is entered.

automatically collating data from the check-in procedure and the loading-check procedure.

giving an indication, visible or audible, at the said location related to identification data for an item of baggage in the loading-check procedure, each time such data is entered, and making available in normal operation of the method to an authorised person, the facility of changing the relationship between the indication given and the identification data for an item of baggage entered at that time.

According to another aspect of the invention a baggage checking system is provided which is able to operate using a dedicated computer or network of dedicated computers. In the most simple system the dedicated computer may be a single PC. However the checking system of the invention is usually interfaced with a host computer such as a computer belonging to, or operated on behalf of, an airport or a passenger carrying organisation. The dedicated computer or system is confined to the operational area, such as a particular airport, in which it is to operate and therefore can operate without data links to other airports and/or main frame computers at remote sites.

Although it is usually more convenient to do so, there is no need for such a system to be coupled to a main frame computer, for example belonging to an airline, provided that it is coupled to at least one check-in desk with an appropriate terminal, at least one data entry device for checking loaded baggage at a loading ramp, and at least one boarding gate with an appropriate terminal.

No requirement exists for data concerning passengers and aircraft to be transferred to or from an airline's main frame computer except, usually, the lists of passengers for each flight. Thus delays or breakdowns in, or in communicating with, such a computer do not usually affect the baggage checking system of the invention.

In the first aspect of the invention the loading-check means may for example be a hand held data entry device for operation at a loading ramp and connected by radio telephone to the collation means provided by a programmed dedicated PC.

DETAILED DESCRIPTION

Figure 1:
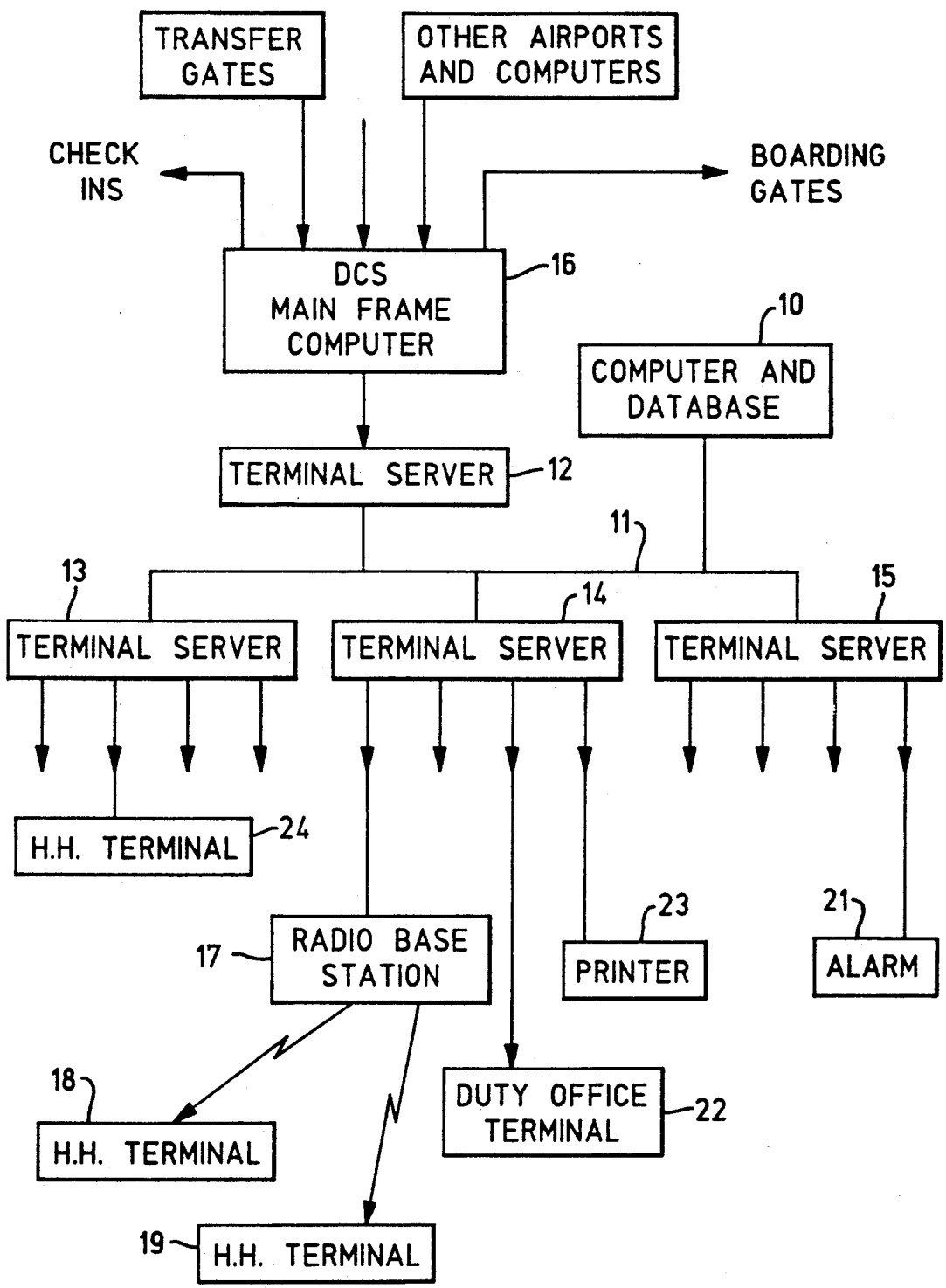
FIG. 1 is a schematic block diagram of one embodiment of a baggage reconciliation system according to the invention coupled to a departure control system (DCS) computer.

In FIG. 1 a computer 10 employing a suitable commercial operating system and holding a database and files for operating a baggage reconciliation system is connected by way of a LAN 11 to terminal servers 12 to 15. A main frame computer 16 operating a DCS is connected to the terminal 12 and receives signals from check-ins, boarding gates, transfer gates, other airports and other computers. The terminal servers 13, 14 and 15 have a variety of outlets and some of these are illustrated for the server 14. The servers 13 and 15 may be coupled to similar peripherals. One or more computers for operating baggage reconciliation systems (not shown) may be coupled to the LAN 11.

One peripheral for the server 14 is a radio base station 17 which communicates with hand-held terminals 18 and 19, and other similar terminals (not shown), located at one or more loading ramps where baggage is loaded into containers or aircraft. Each hand-held terminal comprises a keyboard and a display, and usually a bar code reader. The terminals include microprocessors and are therefore "intelligent". When loading is carried out the baggage tag number on each item of baggage is entered using the bar code reader or keyboard before the baggage item is loaded and the entry of the bag tag number may, as will be explained later, cause an alarm 21 connected to the terminal server 15 to give a visual and audible alarm. Hand-held terminals may be coupled by a wire connection to a terminal server and a hand-held terminal 24 is shown coupled in this way.

An airline operating the system of FIG. 1 usually has a terminal 22 in its duty office and this terminal can be used to obtain displays from the computer 10 and print-outs from the computer by way of a printer such as the printer 23. In addition the duty office terminal may be used to change the loading strategy (as will be explained later) and may also be used to enter other information.

Figure 2:
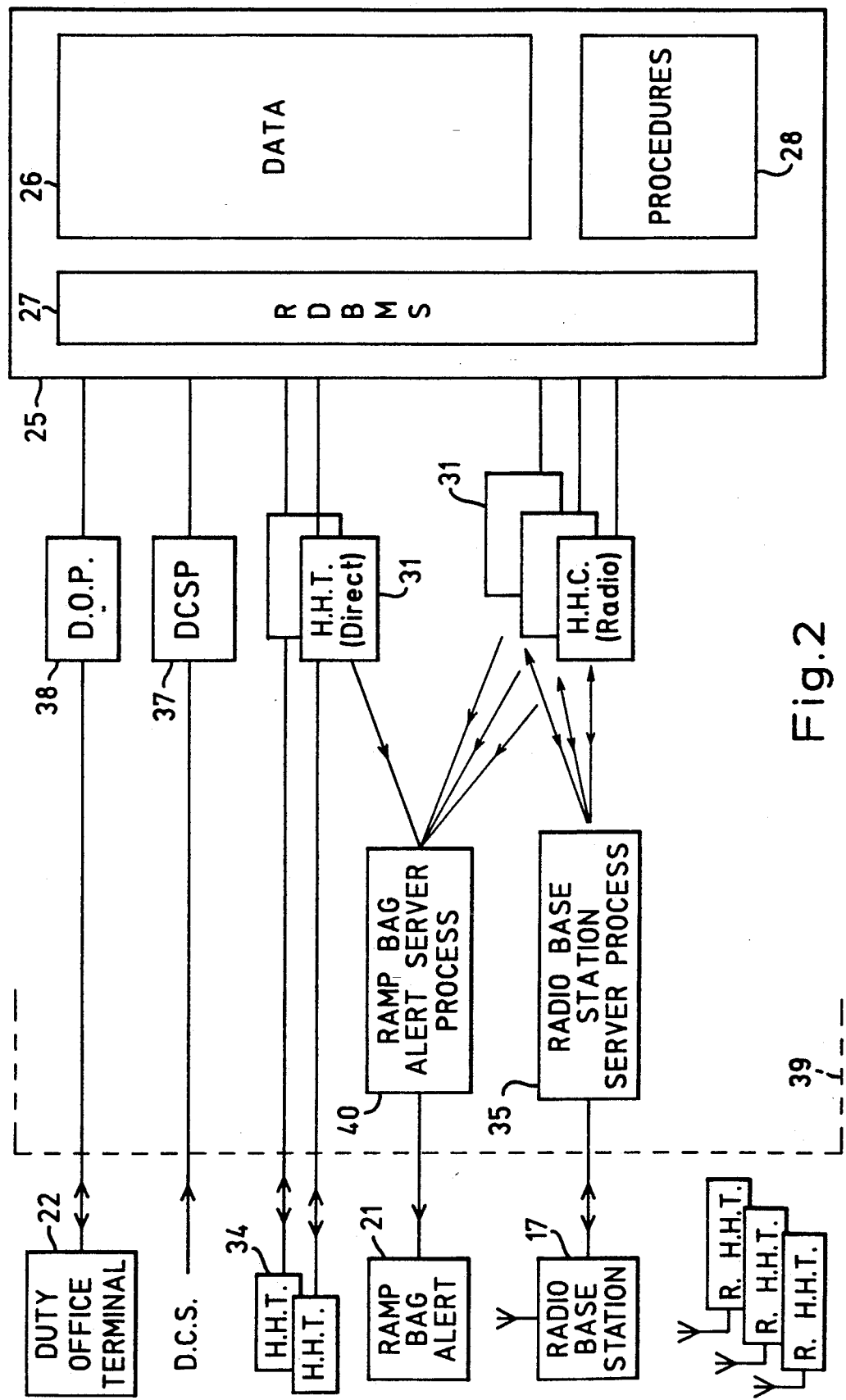
FIG. 2 is a block diagram of the architecture for the baggage reconciliation system of FIG. 1.

FIG. 2 shows the software architecture used. The database is shown as a box 25 with data 26 in the form of tables, a database controller process 27 and procedures 28. The tables and procedures are described in detail later in the specification. Each hand-held terminal has a corresponding control process, (HHC) 31 but those hand-held terminals coupled by way of the radio base station 17 communicate via a further process 35 which interfaces several control processes to the base station. Processes 37 and 3B couple the DCS and the duty office terminal 22 to the database 25, respectively, and the alarm 21 is controlled by a process 40. A chain dotted line 39 indicates the extent of the computer 10.

A Unix operating system may be used by the computer 10 and runs the various programs, procedures and processes which are held as files by the computer. However, since the Unix system is well known and controller processes are conventional and simply condition and pass messages and data between various parts of the system, they are not described further in this specification. If necessary the controller processes could be replaced by hardware and construction of such hardware is conventional.

The display in the duty office is implemented using an Application By Forms (ABF) arrangement. This is supplied with a Relational DataBase Management System (RDBMS) as commercially available from Ingres. Screens for displays on the duty office terminal and print-outs from this terminal can be set up in the usual way for a relational database, by following prompts and instructions available from the Ingres database in its normal operation.

As an outline of the operation of the system of FIG. 1, the check-in and boarding of a point-to-point passenger and the loading of baggage will now be described. At a check-in the passenger's name, flight number and number of items of baggage for the hold are entered into the CS main frame computer 16. In addition an identification number is allocated to the passenger and numbers on baggage tags attached to the passenger's baggage are also entered into the computer 16. The baggage tags are provided by the manufacturer with numbers already printed in digits and/or bar code format. Although duplicate numbers should not occur for any one flight, such duplicates are theoretically possible and are taken into account as will be described in more detail below.

Alternatively, the baggage tag number and barcode may be provided by the computer 16 and printed on to a "demand" baggage tag by a printer located at the check-in desk. This method further reduces the possibility of duplicate numbers being used within a given flight.

The OCS process 37 operated by the computer 10 constantly interrogates the computer 16 by way of the terminal 16 to extract the information it requires to keep the database up to date.

The hold baggage now proceeds independently of the passenger to a loading point, the loading ramp, either for loading into a container which is later loaded into the aircraft or for loading direct into the aircraft.

As mentioned above, in the present invention the baggage tag on each bag is checked at one of the hand-held terminals before being loaded into the container or aircraft. If late loading of baggage on the tarmac becomes necessary a hand-held terminal can be operated at the aircraft hold. The baggage tag number passes by way of the radio base station 17 and the terminal server 14 to the computer 10 where the tag number is checked by the HHC 31 to determine whether it is a duplicate, either expected or unexpected. If, a load-restraint procedure is carried out, a signal is passed to the alarm 21 by way of the process 40 and visual and audible alarms are given. The visual alarm, in these circumstances, displays the message "Dont Load" and "Duplicate". In addition there are, in this example, three possible strategies which may be employed, depending on instructions entered, for example, on the terminal 22 in the duty office:-

1. "Load All" - all bags are loaded except, as indicated above. duplicates,
2. "Load Checked In" - all bags, except duplicates, are loaded provided the passenger owning the bag has checked in (this is the normal strategy), and
3. "Load Boarded"- only bags belonging to passengers who have boarded are loaded and then not if they are duplicates.

These strategies may be modified by adding additional layers to the basic strategies. Qualifiers such as: "has bag been logged as X-rayed?" or "is passenger profile security level OK" may be added to inhibit even Load All" strategy.

In these three strategies the "Dont Load" alarm is given if the conditions specified are not satisfied. This part of the load restraint procedure may prevent the bag being loaded. The system locks the terminal that triggered the alarm so that no more tag numbers can be entered and therefore loading cannot proceed at that point when an alarm is given. Before loading can proceed a supervisor must take suitable action, for example by taking the bag to which the tag with the number entered is attached to a security officer for special treatment and cancelling the entry of the tag number which gave the alarm. Supervisors have "user names" and "passwords" known only to themselves and some other officers, which they enter into, for example, a hand-hand terminal at the loading ramp or the duty office terminal. Such supervisors are able to enter a secret release password into the locked hand-held terminal which frees that terminal for the entry of more tag numbers so that loading can continue.

While loading continues, passengers begin to pass through the boarding gate where their names are entered by way of the boarding gate terminals into the computer 16. The database held by the computer 10 is updated as passengers pass through boarding gates by the DCS process 37 using the interrogation procedure already mentioned. At any time, but usually when all or most passengers have passed through the boarding gate, an operator in the duty office uses either the terminal 22, or one located at the boarding gate, to provide a print-out of reports for that flight, in particular a "misloaded bags report" and a "reconciliation report" described below.

In the above procedures no distinction is made between transfer passengers and other passengers although transfer passengers may check in at transfer desks or boarding gates, and their baggage may arrive at a loading ramp before their baggage tag numbers have been entered into the DCS system of the computer 16 and therefore the baggage reconciliation computer 10.

Any person authorised to deal with "expedite" or "Rush" bags and possessing the necessary password may check in a pseudo-passenger giving the bag owner's name, or a related name, and entering the name marked as an "Expedite" passenger into the database of the computer 10. The tag number of the Expedite bag is also entered at this time. Thus when an Expedite bag arrives at the loading ramp it is dealt with in the normal way but such bags appear in the pre-take-off print-out marked as Expedite and with the name associated with the bag.

Like other bags, these bags will be loaded either at the loading ramp or aircraft after check-in and the system processes their tag numbers in the same way as other tags.

Crew bags can also be handled by the system in a similar way provided they have tags and the tag numbers and the owner's name are entered into the system somewhere, for example the duty office, preferably before the bags are loaded.

The overall operation of the system of FIGS. 1 and 2 is one of keeping the database held by the computer 10 constantly up to date by using inputs from the main frame computer 16, the hand-held terminals and the duty office terminal 22. In addition each time a bag is about to be loaded a check is carried out using the tag number for that bag and loading is only allowed to proceed if a check carried out by the computer 10 on the database is satisfactory.

The database holds the following interrelated information tables:-

FLIGHTS - one record for each flight giving the flight number, the number to be allocated to the next passenger to check in, which becomes that passenger's identification number (PAXID), the loading strategy number and the strategy name.

PASSENGERS - one record for each passenger on a given flight giving the following: flight number, PAXID, name, seat number, number of bags, check-in time, whether boarded, whether Expedite, and identification number of group.

PAX_TAGS - holds one record for each baggage tag associated with a passenger on a flight, giving flight number, PAXID and tag number.

TAG_LOADED - holds one record for each physical item of baggage loaded into a container or aircraft for a flight and gives flight number, tag number, time, container name, container sequence number (ContSeqNum), location and operator. (Where containers are not used, or only partially, a different form of container name is used, for example, BULK or HOLD.)

TAG_LOG - holds one record for each time any tag is scanned anywhere, giving time, tag number, where the tag number was "seen", who saw the tag number, what was being done to the tag. (This table is not one of those tables which interacts with the baggage reconciliation system but it is useful as an aid in tracing movements of baggage within an airport.)

The database also stores named procedures which can be executed on request. These procedures are conveniently in compiled form and examples are given below. They are written here in a simple form which allows them to be understood without reference to a particular computer language and in addition allows the translation of these procedures into any suitable computer language by a person versed in that language.

The general form of the procedures is as follows:

```
ProcedureName(Argument1, Argument2, ------)
{
    statement.
}
``` a) Arguments are information passed to the procedure by whatever process is invoking it.
b) The 'body' of the procedure (between the ( {and }) consists of one or more statements that are executed in sequence.
c) The statements may be split over more than one line. The end of a statement is indicated by a full stop.
d) Local values are created and assigned a value by appearing on the left hand side of an '=' e.g. "Flight =...".
e) Names of real entities begin will capital letters,
f) A set of field values (to be inserted into a database table, for example) are indicated by a list of names within square brackets '[' and ']'.
g) The symbol '<...>' means that extra information may be added here in further implementations.

Before the baggage reconciliation system can be used for any flight, the flight has to be "opened". This procedure is initiated by the DCS process 37 receiving data for a new flight from the DCS. Alternatively, it may be initiated at another terminal, for example the duty office terminal 22. When a flight number is reopened by the DCS after previous use for an earlier corresponding flight, the baggage reconciliation system has already archived the old flight data several hours earlier. The procedure initiated is called New Flight and is given below:-

```
NewFlight(Flight)
{
    insert [Flight, NULL, 1, Initial Strategy no., Initial Strategy name] into FLIGHTS table.
}
```

The flight number, strategy number (which can be an arbitrary number) and the strategy name (which is the name of one of three procedures as is explained below) are inserted into the FLIGHTS table. If the strategy is changed later, the new strategy name is entered together with a strategy number increased by one by a change strategy procedure.

Procedures "NewPassenger" and "NewBagTag" are initiated each time interrogation by the computer 10 of the DCS computer 16 indicates that a new passenger, including a transit passenger, has been checked in. The first procedure assigns PaxId numbers which the passengers must have as a unique identification number within a flight, thus enabling the system to be insulated from changes in other fields of the database such as seat number. The arguments for these procedures are obtained from the DCS computer 16 by the DCS interface process 37. These procedures used are as follows:

```
NewPassenger(Flight, Name, NumOfBags, Group, <...>)
{
    PaxId = NextPaxId for this Flight.
    insert [Flight, PaxId, Name, NumOfBags, CrntTime (current
        time), NotBoarded, NormalPax, Group, <...>]
        into PASSENGERS table.
    increment NextPaxId for this Flight in the FLIGHTS table.
    return PaxId.
}
NewBagTag(Flight, PaxId, TagNumber)
{
    insert [Flight, PaxId, TagNumber] into PAX_TAGS.
}
```

The method of dealing with expedited baggage has already been described as being one which can be initiated by an authorised person from, for example, the duty office terminal 22, or a check-in, or one of the hand-held terminals. The procedure initiated is as follows:

```
ExpeditePassenger(Flight, Name, NumOfBags, <...>)
{
    PaxId = NextPaxId for this Flight.
    insert [Flight, PaxId, Name, NumOfBags, CrntTime,
        NotBoarded, Expedite, <...>]
        into PASSENGERS table.
    increment NextPaxId for this Flight in the FLIGHTS table.
    return PaxId.
}
```

The name entered in this procedure is that of the owner of the expedite bag or some other suitable name preferably implying some relationship with the bag.

A similar procedure can be used for crew bags when the word Crew" is entered instead of "Expedite".

Having dealt with the procedures initiated at check-in, the next part of the specification describes three alternative procedures: "LoadCheckedInTag", "LoadAllTag" and "LoadBoardedTag", one corresponding to each of the strategies mentioned above.

One of these procedures, selected according to the current strategy, is initiated by a loader each time a tag number is read in. Initially, when the loader is to start loading for a flight, he enters the following sequence into his hand-held terminal in response to a sequence of prompts:-
Username, Password, Flight Number, Location Number and Container Number.

Figure 3:
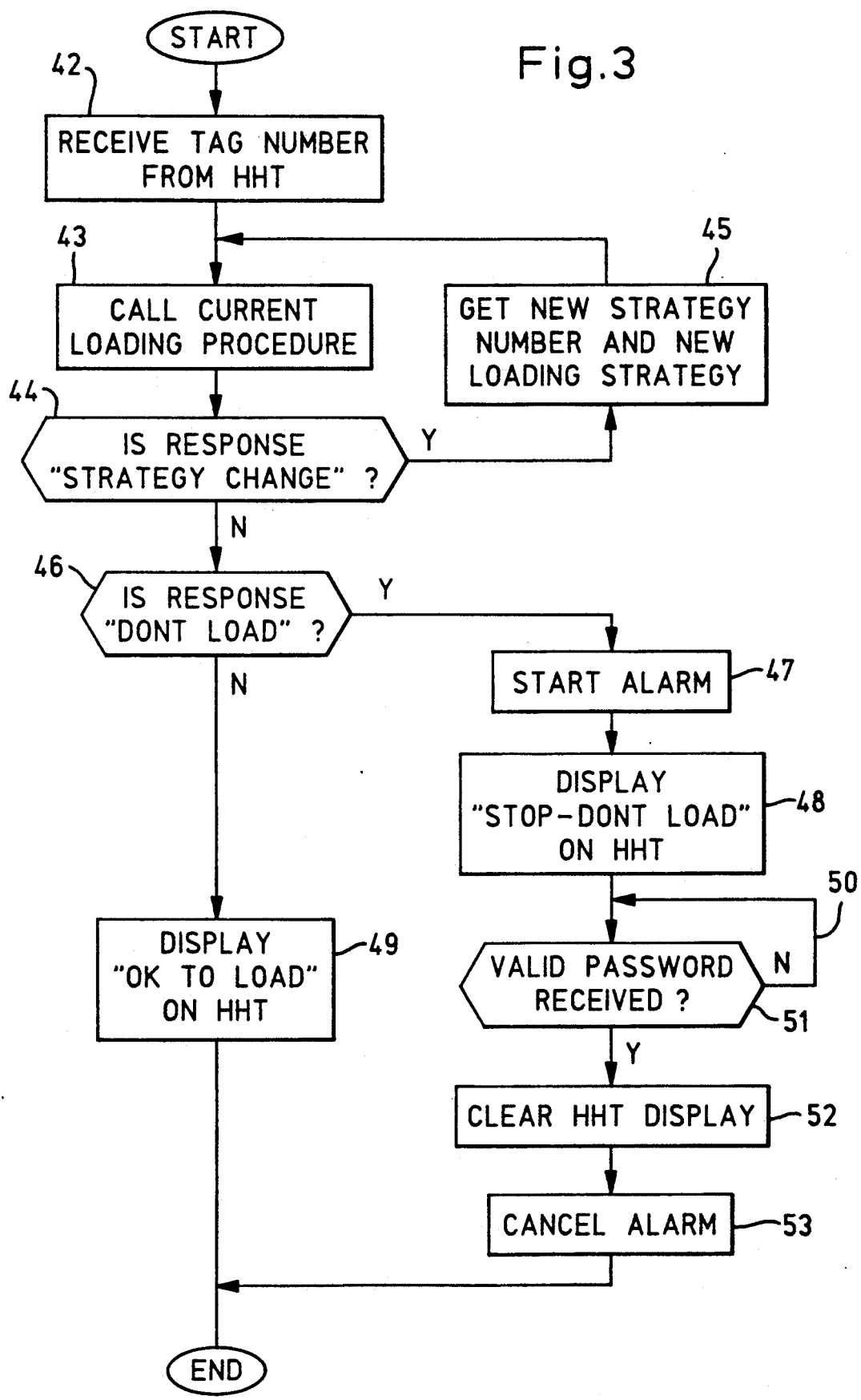
FIG. 3 is a flow chart showing operation and control of a hand-held terminal of FIG. 1.

The hand-held terminal then prompts for a tag number and when such a number is entered, the program of FIG. 3 which is part of one of the processes 31 (see FIG. 2) for the H.H. terminal runs.

When the tag number is received (operation 42) by the process, that one of the loading strategy procedures whose name is stored by the process as the current procedure is initiated (operation 43). The procedure gives a response and, as is explained below, if the procedure called is not the one specified at that time for that flight, the response will be "Strategy Change". Thus if a test 44 is positive the process 31 requests the current strategy name and strategy number from the database in an operation 45 and then returns to the operation 43. Following a negative result from the test 44, a test 46 is carried out to determine whether the response from the loading procedure is one of the following: "Known Duplicate", "Unauthorised Duplicate", "Unauthorised" or "Not Boarded" which is, in effect, an instruction not to load. These responses are represented by "Dont Load" in FIG. 3. A positive response to the test 46 causes a message to be sent (operation 47) to the process 40 which controls a large display and alarm siren in the loading area (that is the alarm 21). The process 31 also carries out an operation 4B to send a message to the H.H. terminal causing it to display "Stop—Dont Load". If response to the test 46 is negative, a message is sent to the hand-held terminal causing it to display "OK to load" (operation 49).

Following "Dont Load" messages the process 31 is locked into a loop 50, so that the hand-held terminal controller cannot be used until a password test 51 is positive at the time when a supervisor enters the appropriate password to unlock the system at that hand-held terminal. When the test 51 becomes positive operations 52 and 53 to clear the hand-held terminal display and cancel the alarm are carried out.

The H.H. terminals together with the radio base station are commercially available and each H.H. terminal is programmed by means of a ROM which contains the program required. The programming of the ROMs follows well known techniques to allow the passing of messages to and from the computer containing the database, to display prompts, messages and give audible alarms, and to allow data (including tag numbers), replies to prompts and other information to be entered.

In the description of the LoadCheckedInTag procedure given below explanations of parts of the procedure are indicated in well known way for "Remarks" by enclosing each line of explanation between "/*" and "*/".

```
LoadCheckedInTag(Flight, TagNumber, Location, Container,
Operator, H.H. strategy sequence no.)
{
    Current strategy number = strategy number of [Flight] in
    FLIGHTS
    KnownDups = count of [Flight, TagNumber] in PAX_TAGS
    NumDupsLoaded = count of [Flight, TagNumber] in
    TAG_LOADED
        /* Note that "count of [Flight, TagNumber]" means the    */
        /* number of times a tag number appears in the table     */
        /* specified. Thus if a tag number has been checked in   */
        /* but not loaded it will appear once in PAX_TAGS but    */
        /* not at all in TAG_LOADED                              */
    if H.H. strategy number ≠ current strategy number
    then
        Response = 'Strategy Change'
    else
    if KnownDups > 1
    then
        /* The baggage reconciliation system knows about more    */
        /* than one of these tags - hence tag is a duplicate so  */
        /* refuse loading                                        */
        Response = 'Known Duplicate'
    else if NumDupsLoaded > = KnownDups
    then
        /* The baggage reconciliation system has already loaded  */
        /* as many of this tag number as it knew about (or has   */
```

-continued
```
    /* loaded 0 of 0), hence this tag is an UNAUTHORISED  */
    /* Tag.                                                */
    /* A Lone (non-duplicate) is now distinguished from an */
    /* Unauthorised Tag and a Duplicate Unauthorised Tag   */
    /* because for a duplicate, it may be the one(s) that  */
    /* are already loaded that are really unauthorised.    */
    if NumDupsLoaded > 0
    then
        Response = 'Unauthorised Duplicate'
    else
        Response = 'Unauthorised'
    endif
    /* tag is AUTHORISABLE. ie the system knows about      */
    /* it and has NOT YET LOADED all the known tags.       */
    else    /* Ok to load the bag now                      */
        /* Get the next container sequence number          */
        ContSeqNum = maximum container sequence number
            in TAG_LOADED for [Flight, Container]
        /* Now insert the tag into the TAG_LOADED table    */
        insert [Flight, TagNumber, time, Container, ContSeqNum,
            Location, Operator] into TAG_LOADED
        Response = 'Ok to load'
    endif
    /* Update TAG_LOG to record having seen the tag        */
    insert [Flight, TagNumber, Location, Operator, 'LoadCheckedIn']
        into TAG_LOG
    return Response
}
```

The statement return Response causes the alarm 21 to display the message 'Ok to load' if "Response" has been set to 'Ok to load' but an audio visual alarm is given and the setting of Response is displayed, that is either "Known Duplicate", "Unauthorised Duplicate" or "Unauthorised".

The LoadAllTag procedure is the same as the LoadCheckedInTag procedure except that the condition "if NumDupsLoaded >=KnownDups" is changed to "if NumDupsLoaded >0".

This has the effect of not considering if the tag is known (for example checked).

The LoadBoardedTag procedure is the same as the LoadCheckInTag procedure except as follows:-

```
PaxId = pax_id of [FlightId, TagNumber] in PAX_TAGS
Boarded = boarded of [FlightId, PaxId] in PAXS are added to
follow
    NumDupsLoaded = count of [FlightId, TagNumber] in
    Tag_Loaded;
and
the condition:
    else if (Boarded ≠ 'Y')
    then
        Response = 'Not Boarded'
is added to follow the remark
    /* NOT YET LOADED all the known tags.        */
```

The last procedure to be described is concerned with passengers boarding and off-loading, off-loading occurring when a passenger who has boarded has to pass back through the boarding gate for some reason. The procedures used are "PaxBoarded" and "PaxOffLoaded". Initiation of these procedures occurs when interrogation by the computer 10 of the DCS computer 16 indicates that a passenger is about to pass through a boarding gate either towards or away from an aircraft. The arguments required are obtained from the computer 16.

```
PaxBoarded_FlightSeq(ThisFlight, Seat)
{
```

```
    update PASSENGERS record
        where Flight = ThisFlight and SeatNumber = Seat
        set Boarded = TRUE.
}
```

Occasionally a passenger has to disembark before take-off or pass through the boarding gate away from the boarding lounge back into the general departures area. A procedure PaxOffLoaded is then used.

```
PaxOffLoaded_FlightSeq(ThisFlight, Seat)
{
    as above but with "Boarded = FALSE"
}
```

Several alternative procedures for indicating that a passenger has boarded a flight may be used. For example the passenger may be identified by his identification number, or sequence number (that is a number allocated by an airline to a passenger on check-in and similar to PAXID but not allocated by the computer 10) and each means of identification may have a corresponding procedure. The procedure changes the status of the field "Boarded" from false to true.

The strategy used can be changed at any time during the loading of a flight and in practice this often happens since conditions are likely to change during loading. For example loading may start using the normal strategy (strategy 2 - load checked in bags only) but if loading falls behind schedule and the flight departure time is approaching then a change may be made to the first strategy loadall). For a flight which is considered as a particular security risk, the third strategy (load boarded) is used.

The duty officer can use the database and the duty office terminal to call for various displays (screens) or print-outs at any time during loading so that he has available the present state of loading and boarding. Such a print-out is particularly useful when loading and boarding is complete or almost complete and is then available for study before the aircraft moves for take-off. One useful display or print-out is as shown in Table 1.

TABLE 1

| Id No | Passenger Name | Grp | Brd | Bags | Loaded |
|-------|----------------|-----|-----|------|--------|
| 001   | ------         |     | N   | 0    | .      |
| 002   | ------         | 002 | Y   | 2    | Y      |
| 003   | ------         | 002 | Y   | 2    | N      |
| 004   | ------         |     | E   | 1    | Y      |
| 005   | ------         |     | E   | 2    | Y      |
| 006   | ------         | 006 | Y   | 2    | Y      |
| 007   | ------         | 006 | N   | 0    | .      |
| 008   | ------         |     | Y   | 3    | Y      |
| 009   | ------         |     | Y   | 2    | Y      |

A "Y" in the "Loaded" field is an indication that all bags with tag numbers belonging to the passenger named are loaded and an "N" indicates that at least one such bag has not been loaded. The "E" in the "Brd" (boarded) field indicates that the passenger is an Expedite and not a real person.

Table 1 is obtained by joining the "Passengers", "Pax_Tags" and "Tag_loaded" tables. Joining tables will be familiar to those with a working knowledge of Ingres, or similar database products.

The "misloaded bags" report mentioned above, that is a list of all tag numbers for loaded bags where there is no corresponding passenger, is produced by a similar procedure in which all the tag numbers in the "Tag__loaded" table are associated with PAXID numbers in the "Pax_Tags" table to determine if an owner is known. If not the tag number and container details are added to the report.

The "reconciliation" report (all tag numbers in previous report plus all tag numbers of bags belonging to not boarded passengers, or passengers in incompletely boarded groups) is provided in the same way except that after checking if a passenger has boarded a further check is carried out to determine whether all passengers with the same group identification number in the "Passengers" table have boarded and if not the tag numbers of the group's bags are added to the report together with any available additional information required.

The tables held by the database can easily be manipulated by a moderately skilled operator in many other ways as required to give quick responses to queries posed in the form of "screens" and print-outs.

A number of screens can be set up as mentioned above to be called up by operating a single keyboard key or moving a cursor to a certain position and then operating a key.

A main menu screen is defined in this way and offers the following choices:-
 Flights (shows details of flights known to the system),
 Flight Status (shows number bags and duplicate bags).
 Passengers (lists the passengers for a flight),
 Loaded Bags (for a selected flight).
 Missing Bags (for a selected flight).
 Unauthorised Bags (for a selected flight).
 Reports (used to call the following reports: passenger, container, missing passenger and missing baggage), and
 Supervisor Functions (used to display or alter the current loading strategy for a flight).

The Passengers screen allows a user to select the passengers listed who have boarded or are missing, as well as listing all passengers for that flight. A menu for this screen allows the following choices:-
 Information on passenger tags, a passenger or a group of passengers can be selected dependent on the cursor position,
 Information on a selected passenger, and
 Information on a selected passenger's tags.

The Passengers report lists all checked-in passengers and, for each passenger, their bag tag numbers, their seat number and whether boarded. The Missing Passengers report is similar to the passengers report but only shows those passengers who have not boarded. The Missing Bags report lists the tag numbers of all checked-in bags which have not been loaded with details of the owner. The Container report lists the tag numbers of the bags loaded, their sequence number (that is position) in the container loading sequence and the number of bags per container. These reports can be printed from the Reports screen.

The Supervisor Functions screen, which is password protected, lists the functions available to the supervisor and the user moves the cursor up and down to select a desired function. One of these functions calls another screen which displays the current strategy for a flight and allows it to be changed.

Having specifically described certain embodiments of the invention, it will be clear that the invention can be put into practice in many other ways using different procedures, databases, operating systems, networks (if required) and hardware. As mentioned above there is no need to employ a mainframe computer such as one belonging to a passenger carrying organisation or an airport or a DCS, since a single PC connected to check-in, transfer and boarding gates can be programmed and can have sufficient capacity to operate a system according to the invention. Baggage checking and reconciliation for other systems, other than airlines, such as travel systems not using aircraft may be provided using the invention.

Baggage accompanying a passenger in the passenger compartment may be treated in the same way as baggage travelling in a hold. Arrangements are then made to enter data from tags on the passenger-compartment baggage as for hold baggage.

We claim:

1. Apparatus for checking travellers' baggage comprising
 check-in means for entering and storing, for each traveller, identification data for the traveller, for at least one item of baggage in the traveller's charge and to travel to the same destination as the traveller (but not under the traveller's control) and for a vehicle on which the traveller and the said item are to travel,
 loading-check means for entering, for each item of baggage, identification data of the item and of a vehicle on which it is intended to load that item, the loading-check means being positioned, in operation, at a location where baggage is loaded for travel in vehicles,
 collation means, coupled for communication with the check-in means and the loading-check means, for automatically collating data received from the check-in means and the loading-check means, and
 loading-control means, coupled to the collation means, for carrying out a load-restraint procedure at the said location of the loading-check means for each item of baggage when the identification data for that item is entered at the load check means if the automatic collation determines, from the identification data, that the item should not be loaded at least until authorization is obtained.

2. Apparatus according to claim 1 wherein the collation means comprises
 means for associating, in a predetermined way, the identification data of each item of baggage with the identification data of the traveller in charge of that item and the identification data of the vehicle on which the traveller and the said item are to travel, and
 means for checking for each item of baggage whose identification data is entered at the loading-check means that the vehicle on which it is intended to load that item is associated in the said predetermined way with that item,
 the loading-control means being arranged to carry out said load restraint procedure if the said means for checking does not indicate for any item of baggage that the item is associated in the same predetermined way with the vehicle on which it is intended to load that item.

3. Apparatus according to claim 1 for checking aircraft baggage wherein the loading-control means is arranged to carry out said load-restraint procedure if the means for checking indicates for an item of baggage that its identification data duplicates that of another item of baggage which is to travel on the same vehicle.

4. Apparatus according to claim 1 wherein
the collation means is arranged to determine whether each item of identification data for baggage items entered at the loading-check means corresponds to an item of identification data for a baggage item already entered at the check-in means, and to cause the loading-control means to carry out said load-restraint procedure if no such correspondence exists.

5. Apparatus according to claim 1 including
boarding-check means for entering the identification data of each traveller who passes into a location where travellers have entered a vehicle or must, unless released, do so, wherein
the collation means is coupled for communication with the boarding-check means, and
the collation means is arranged to determine whether each item of identification data for baggage items entered at the loading-check means corresponds to an item of identification data for a baggage item already entered at the boarding-check means, and to cause the loading-control means to give an audible or visual alarm if no such correspondence exists in carrying out the load-restraint procedure.

6. Apparatus according to claim 1 including
boarding-check means for entering the identification data of each traveller who passes into a location where travellers have entered a vehicle or must, unless released, do so, wherein
the collation means is coupled for communication with the boarding-check means, and includes
means for associating the identification data of each item of baggage with the identification data of the traveller in charge of that item, and
means for signalling whether each item of baggage is associated with a traveller who has passed into the said location.

7. Apparatus according to claim 1 wherein the collation means includes
means for inhibiting the loading-check means from operation as part of said load-restraint procedure if said, loading-restraint procedure is carried out, and
means for releasing the loading-check means in response to a predetermined operation.

8. Apparatus according to claim 1 wherein
the collation means is arranged to provide, when appropriate, an output which can be understood by a person and is dependent on the result of collation.

9. Apparatus according to claim 1 wherein
the collation means is provided by a first programmed computer, and
the loading-check means is provided by a hand-held computer terminal coupled to the first computer byway of a radio link.

10. Apparatus according to claim 9 wherein the loading-check means includes
a bar code reader connected to the computer terminal for reading the identification data of items of baggage which, in operation, is provided by means of bar codes on tags attached to the items.

11. Apparatus according to claim 10 wherein the loading check means carries out said loading restraint procedure by giving a visual or audible alarm.

12. Apparatus according to claim 1 for baggage checking at an airport wherein
the collation means is provided by a programmed computer which is distinct from any computer operating a passenger seat reservation system.

13. Apparatus according to claim 1 wherein the items of baggage are loaded into containers for predetermined aircraft,
the loading-check means is arranged to receive container identification data, and
the collation means receives the identification data of each container and each item of baggage and provided a record of the items loaded into each container.

14. A method for checking travellers' baggage, comprising
a check-in procedure for entering and storing for each traveller identification data for the traveller, for at least one item of baggage in the traveller's charge and to travel to the same destination as the traveller (but not under the traveller's control), and for a vehicle on which the traveller and the said item are to travel,
a loading-check procedure at a location where baggage is loaded for travel in vehicles and in which identification data of baggage is entered,
automatically collating data from the check-in procedure and the loading-check procedure, and
carrying out a load-restraint procedure at the said location for each item of baggage when the identification data for that item is entered during the load check procedure if the automatic collation determines, from the identification data, that the item should not be loaded at least until authorization is obtained.

15. A method according to claim 14 wherein automatically collating data includes
associating, in a predetermined way, the identification data of each item of baggage with the identification data of the traveller in charge of that item and the identification data of a vehicle on which the traveller and the said item are to travel, and
checking for each item of baggage whose identification data is entered in the loading check procedure that the vehicle on which it is intended to load that item is associated in the said predetermined way with that item.

16. A method according to claim 15 wherein the load restraint procedure includes
giving an alarm if the step of checking does not indicate for an item of baggage that the item is associated in the said predetermined way with the vehicle on which it is intended to load that item.

17. A method according to claim 15 wherein the load restraint procedure includes
inhibiting the loading check procedure from operation if the step of checking does not indicate for an item of baggage that the item is associated in the said predetermined way with the vehicle on which it is intended to load that item, and
releasing the loading check means in response to a predetermined operation.

18. A method according to claim 14 including a boarding-check procedure for entering the identification data of each traveller who passes into a location where the travellers have entered a vehicle or must, unless released, do so, including
- associating the identification data of each item of baggage with the identification data of the traveller in charge of that item, and
- signalling whether each item of baggage is associated with a traveller who has passed into the said location.

19. A method according to claim 14 wherein
- bags are loaded into containers for predetermined aircraft,
- the loading-check procedure includes receiving container identification data, and
- automatic collation includes receiving the identification data of each container and each item of baggage and provides a record of the items loaded into each container.

20. Apparatus for checking travellers' baggage comprising
- check-in means for entering and storing for each traveller identification data for the traveller, for at least one item of baggage in the traveller's charge and to travel to the same destination as the traveller (but not under the traveller's control) and for a vehicle on which the traveller and the said item are to travel,
- loading-check means for entering for each item of baggage identification data of the item and of a vehicle on which it is intended to load that item, the loading-check means being positioned, in operation, at a location where baggage is loaded for travel in vehicles,
- collation means, coupled for communication with the check-in means and the loading-check means, for automatically collating data received from the check-in means and the loading-check means,
- loading-control means for carrying out a load restraint procedure, at the said location of the loading-check means for each item of baggage when the identification data for that item is entered at the loading check means said load-restraint procedure being related to the said identification data, and
- strategy-control means, available in normal operation of the apparatus to an authorized person, for changing the relationship between the said load restraint procedure and the identification data for an item of baggage entered at that time.

21. Apparatus according to claim 20 wherein the said load restraint procedure includes giving a visual indication dependent on said identification data, and
- the strategy-control means is arranged to allow a said authorized person to change the content of the indication given in changing the said relationship.

22. Apparatus according to claim 20 wherein the said load restraint procedure includes giving a visual indication dependent on said identification data, and
- the strategy-control means is arranged to allow a said authorized person to change the conditions under which certain indications are given in changing the said relationship.

23. Apparatus according to claim 20 wherein
- the loading-control means gives, in carrying out said load restraint procedure, under predetermined conditions, an indication that an item of baggage should not be loaded when the identification data for that item is entered at the loading-check means, and
- the strategy-control means is arranged to allow a said authorized person to change the said predetermined conditions.

24. Apparatus according to claim 23 including
- boarding-check means for entering the identification data of each traveller who passes into a location where travellers have entered a vehicle or must, unless released, do so, wherein
- the collation means is coupled for communication with the boarding-check means, and includes
- means for associating the identification data of each item of baggage with the identification data of the traveller in charge of that item, and
- means for signalling whether each item of baggage is associated with a traveller who has passed into the said location, wherein
- there are at least two predetermined conditions which a said authorised person can select, the two conditions being selected from:
  (i) the identification data entered for an item of baggage is the same as has been entered more than once at the check-in means or has already been entered at the loading-check means,
  (ii) as (i) plus the identification data entered for an item of baggage does not relate to the identification data of any traveller which has been entered at the check-in means for the same destination and travel by the same vehicle as the item of baggage, and
  (iii) as (i) plus the identification data entered for an item of baggage relates to an item in the charge of a traveller whose identification data has not been entered at the boarding-check means.

25. A method for checking travellers' baggage, comprising
- a check-in procedure for entering and storing for each traveller identification data for the traveller, for at least one item of baggage in the traveller's charge and to travel to the same destination as the traveller (but not under the traveller's control), and for a vehicle on which the traveller and the said item are to travel,
- a loading-check procedure at a location where baggage is loaded for travel in vehicles and in which identification data of baggage is entered, and
- automatically collating data from the check-in procedure and the loading-check procedure,
- giving an indication, visible or audible, at the said location related to identification data for an item of baggage in the loading-check procedure, each time such data is entered, and
- making available in normal operation of the method of an authorised person, the facility of changing the relationship between the indication given and the identification data for an item of baggage entered at that time.

26. A method according to claim 25 including
- a boarding-check procedure for entering the identification data for each traveller who passes into a location where the travellers have entered a vehicle or must, unless released, do so, including
- associating the identification data of each item of baggage with the identification data of the traveller in charge of that item, and
- signalling whether each item of baggage is associated with a traveller who has passed into the said location, wherein
- under predetermined conditions, a load restraint procedure is carried out for an item of baggage when the identification data for that item is entered at the loading-check procedure, and the facility for changing the said relationship is arranged to allow a said authorized person to change the said conditions, there being at least two predetermined conditions which a said authorized person can select, the two conditions being selected from:

(i) the identification data entered for an item of baggage is the same as has been entered more than once at the check-in procedure or has already been entered at the loading-check procedure, (ii) as (i) plus the identification data entered for an item of baggage does not relate to the identification data of any traveller which has been entered at the check-in means for the same destination and travel by the same vehicle as the item of baggage, and (iii) as (i) plus the identification data entered for an item of baggage relates to an item in the charge of a traveller whose identification data has not been entered at the boarding-check procedure.

* * * * *